United States Patent [19]

Persinski et al.

[11] Patent Number: 4,936,987

[45] Date of Patent: Jun. 26, 1990

[54] SYNERGISTIC SCALE AND CORROSION INHIBITING ADMIXTURES CONTAINING CARBOXYLIC ACID/SULFONIC ACID POLYMERS

[75] Inventors: Leonard J. Persinski, Pittsburgh; Jerry L. Walker, Coraopolis; Bennett P. Boffardi, Bethel Park, all of Pa.

[73] Assignee: Calgon Corporation, Pittsburgh, Pa.

[21] Appl. No.: 194,639

[22] Filed: May 16, 1988

Related U.S. Application Data

[60] Continuation-in-part of Ser. No. 925,771, Oct. 10, 1986, abandoned, which is a division of Ser. No. 732,446, May 9, 1985, Pat. No. 4,640,793, which is a continuation of Ser. No. 578,331, Feb. 14, 1984, abandoned, which is a continuation-in-part of Ser. No. 472,808, Mar. 7, 1983, abandoned.

[51] Int. Cl.$^5$ .............................................. C02F 5/14
[52] U.S. Cl. .................................. 210/699; 210/701; 252/180
[58] Field of Search ............................ 210/696–701; 252/180, 181, 389.2, 389.21, 389.23, 389.52, 389.54; 422/15–19

[56] References Cited

U.S. PATENT DOCUMENTS

| | | | |
|---|---|---|---|
| 2,983,712 | 5/1961 | Wilkinson | 260/79.3 |
| 3,284,187 | 11/1966 | Lindner | 71/3 |
| 3,332,904 | 7/1967 | Combe et al. | 260/33.2 |
| 3,344,174 | 9/1967 | Broussalian | 260/507 |
| 3,506,707 | 4/1970 | Miller et al. | 260/513 |
| 3,514,376 | 5/1970 | Salutsky | 203/7 |
| 3,544,597 | 12/1970 | Killam | 260/332.1 |
| 3,547,899 | 12/1970 | Arit et al. | 260/79.3 |
| 3,578,589 | 5/1971 | Hwa et al. | 210/701 |
| 3,663,448 | 5/1972 | Ralston | 252/180 |
| 3,682,224 | 8/1972 | Bleyle | 159/47 R |
| 3,692,673 | 9/1972 | Hoke | 210/728 |
| 3,706,717 | 12/1972 | Siegele | 210/701 |
| 3,709,815 | 1/1973 | Boothe et al. | 252/180 |
| 3,791,978 | 2/1974 | Krueger et al. | 252/180 |
| 3,879,288 | 4/1975 | Siegele | 210/701 |
| 3,885,914 | 5/1975 | Hollingshad et al. | 422/19 |
| 3,890,228 | 6/1975 | Hwa et al. | 210/701 |
| 3,898,037 | 8/1975 | Lange et al. | 252/149 |
| 3,928,196 | 12/1975 | Persinski et al. | 252/180 |
| 3,941,562 | 3/1976 | Hollingshad | 422/16 |
| 3,959,167 | 5/1976 | Hwa et al. | 252/180 |
| 3,965,027 | 6/1976 | Boffardi et al. | 252/180 |
| 3,992,318 | 11/1976 | Gaupp et al. | 252/389 |
| 4,026,815 | 5/1977 | Kallfas et al. | 252/180 |
| 4,048,066 | 9/1977 | Cuisia et al. | 210/701 |
| 4,166,041 | 8/1979 | Goodman | 252/180 |
| 4,168,230 | 9/1979 | Farley | 210/701 |
| 4,209,398 | 6/1980 | Ii et al. | 210/701 |
| 4,255,259 | 3/1981 | Hwa et al. | 210/700 |
| 4,342,653 | 8/1982 | Halverson | 210/734 |
| 4,361,492 | 11/1982 | Dubin | 252/175 |
| 4,427,568 | 1/1984 | Snyder et al. | 252/180 |
| 4,432,884 | 2/1984 | Kawasaki et al. | 252/180 |
| 4,442,009 | 4/1984 | O'Leary et al. | 210/697 |
| 4,443,340 | 4/1984 | May et al. | 210/697 |
| 4,499,002 | 2/1985 | Masler et al. | 252/180 |
| 4,502,978 | 3/1985 | Romberger et al. | 252/389 |
| 4,509,987 | 4/1985 | Farrar et al. | 106/308 Q |
| 4,540,510 | 9/1985 | Karl | 8/558 |
| 4,552,665 | 11/1985 | Ralston et al. | 210/701 |
| 4,566,972 | 1/1986 | Bennison et al. | 252/180 |
| 4,566,973 | 1/1986 | Masler et al. | 252/180 |
| 4,566,974 | 1/1986 | Masler et al. | 252/180 |
| 4,576,722 | 3/1986 | Gaylor et al. | 210/701 |
| 4,640,793 | 2/1987 | Persinski et al. | 210/701 |
| 4,666,609 | 5/1987 | Tsuneki et al. | 210/701 |
| 4,698,161 | 10/1987 | Hansen | 210/701 |
| 4,798,683 | 1/1989 | Boffardi et al. | 252/389.54 |

FOREIGN PATENT DOCUMENTS

| | | |
|---|---|---|
| 62718 | 10/1982 | European Pat. Off. |
| 2198106 | 3/1974 | France |
| 2486949 | 1/1982 | France |
| 2511668 | 2/1983 | France |
| 2515631 | 5/1983 | France |
| 52-123390 | 10/1977 | Japan |
| 56-73600 | 11/1979 | Japan |
| 55-24531 | 2/1980 | Japan |
| 55-79095 | 6/1980 | Japan |
| 83/2628 | 1/1982 | PCT Int'l Appl. |
| 1203449 | 8/1970 | United Kingdom |
| 2054548 | 2/1981 | United Kingdom |
| 2061249 | 5/1981 | United Kingdom ............ 210/699 |
| 2082600 | 3/1982 | United Kingdom |
| 83/02607 | 8/1983 | World Int. Prop. O. |

OTHER PUBLICATIONS

Derwent Abs. 57534 D/32 (J56073600).
Japan Organo KK (6-1981).

*Primary Examiner*—Peter Hruskoci
*Attorney, Agent, or Firm*—W. C. Mitchell; M. C. Sudol, Jr.

[57] ABSTRACT

The instant invention is directed to an admixture, and its use in inhibiting scale and corrosion in aqueous systems, comprising:

(a) a water-soluble polymer having a weight average molecular weight of less than 25,000, as determined by low angle laser light scattering, comprising an unsaturated carboxylic acid and an unsaturated sulfonic acid, or their salts, having a ratio of 1:20 to 20:1, and (b) at least one compound selected from the group consisting of water-soluble polycarboxylates, phosphonates, phosphates, polyphosphates, metal salts and sulfonates.

The instant invention is also directed to a method of inhibiting the formation of insoluble alluvial, metal oxide and metal hydroxide deposits in an aqueous system, comprising adding to the system at least 0.1 mg/l of a water-soluble polymer having a weight average molecular weight of less than 25,000, as determined by low angle laser light scattering, comprising an unsaturated carboxylic acid and an unsaturated sulfonic acid, or their salts, having a ratio of 1:20 to 20:1 and a phosphonate.

1 Claim, No Drawings

SYNERGISTIC SCALE AND CORROSION INHIBITING ADMIXTURES CONTAINING CARBOXYLIC ACID/SULFONIC ACID POLYMERS

This is a continuation-in-part application of U.S. Ser. No. 925,771, filed Oct. 10, 1986 now abandoned, which is a division of application Ser. No. 732,446 (now U.S. Pat. No. 4,640,793), filed May 9, 1985, which is a continuation of application Ser. No. 578,331 (now abandoned), filed Feb. 14, 1984, which is a continuation-in-part of application Ser. No. 472,808 (now abandoned), filed Mar. 7, 1983.

BACKGROUND OF THE INVENTION

U.S. Pat. No. 3,928,196 discloses the use of a copolymer of 2-acrylamido-2-methylpropylsulfonic acid and acrylic acid in inhibiting scale. The instant invention is directed to a synergistic admixture of a water-soluble polymer comprising a carboxylic acid and a sulfonic acid or their salts, including the copolymer of U.S. Pat. No. 3,928,196, in combination with at least one compound selected from the group consisting of water-soluble polycarboxylates, phosphonates, phosphates, polyphosphates, metal salts and sulfonates.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems causing delays and shutdowns for cleaning and removal.

Scale-forming compounds can be prevented from precipitating by inactivating their cations with chelating or sequestering agents, so that the solubility of their reaction products is not exceeded. Generally, this requires as much chelating or sequestering agent as cation, since chelation is a stoichiometric reaction, and these amounts are not always desirable or economical.

Almost 50 years ago, it was discovered that certain inorganic polyphosphates would prevent such precipitation when added in amounts far less than the concentrations needed for sequestering or chelating. By polyphosphates, we mean phosphates having a molar ratio of metal oxide:$P_2O_5$ between 1:1 and 2:1.

When a precipitation inhibitor is present in a potentially scale-forming system at a markedly lower concentration than that required for sequestering (stoichiometric) the scale-forming cation, it is said to be present in "threshold" amounts. See for example, Hatch and Rice, "Industrial Engineering Chemistry", Vol. 31 pages 51 to 53 (Jan. 1939); Reitemeier and Buehrer, "Journal of Physical Chemistry", Vol. 44, No. 5, pages 535 to 536 (May 1940); Fink and Richardson, U.S. Pat. No. 2,358,222; and Hatch, U.S. Pat. No. 2,539,305.

Generally, sequestering takes place at a weight ratio of threshold active compound greater than scale-forming cation components. Threshold inhibition generally takes place at a weight ratio of threshold active compound to scale-forming cation components of less than about 0.5:1.0.

Certain water soluble polymers, including groups derived from acrylamide and acrylic acid have been used to condition water containing scale-forming compounds. For example, see U.S. Pat. Nos. 2,783,200; 3,514,476; 2,980,610; 3,285,886; 3,463,730 and 3,518,204.

DESCRIPTION OF THE INVENTION

The instant invention is directed to an admixture comprising:

(a) a water-soluble polymer having a weight average molecular weight of less than 25,000, as determined by low angle laser light scattering, comprising an unsaturated mono-carboxylic acid and an unsaturated sulfonic acid selected from the group consisting of 2-acrylamido-2-methylpropyl sulfonic acid, 2-methacrylamido-2-methylpropyl-sulfonic acid, styrene sulfonic acid, vinyl sulfonic acid, sulfoalkyl acrylate, sulfoalkyl methacrylate, allyl sulfonic acid, methallyl sulfonic acid, 3-methacrylamido-2-hydroxy-propyl sulfonic acid, sulfonic acid acrylate, their salts and mixtures thereof, having a weight ratio of 1:20 to 20:1, and (b) at least one compound selected from the group consisting of water-soluble polycarboxylates, phosphonates, organic phosphates, organic polyphosphates, metal salts and sulfonates.

The instant invention is also directed to a method of inhibiting the precipitation of scale-forming salts in an aqueous system, comprising adding to the system at least 0.1 mg/l of an admixture of:

(a) a water-soluble polymer having a weight average molecular weight of less than 25,000, as determined by low angle laser light scattering, comprising an unsaturated carboxylic acid selected from the group consisting of acrylic acid, methacrylic acid, α-halo acrylic acid, maleic acid or anhydride, itaconic acid or anhydride, vinyl acetic acid, allyl acetic acid, fumaric acid, β-carboxyethyl acrylate, their salts, and mixtures thereof, and an unsaturated sulfonic acid selected from the group consisting of 2-acrylamido-2-methylpropyl sulfonic acid, 2-methacrylamido-2-methylpropylsulfonic acid, vinyl sulfonic acid, sulfoalkyl acrylate, sulfoalkyl methacrylate, allyl sulfonic acid, methallyl sulfonic acid, 3-methacrylamido-2-hydroxy-propyl sulfonic acid, sulfonic acid acrylate, their salts and mixtures thereof, having a weight ratio of 1:20 to 20:1, and (b) at least one compound selected from the group consisting of water-soluble polycarboxylates, phosphonates, phosphates, polyphosphates, metal salts and sulfonates.

The instant invention is also directed to a method of inhibiting the corrosion of metal in an aqueous system comprising adding to the system at least 0.1 mg/l of an admixture of:

(a) a water-soluble polymer having a weight average molecular weight of less than 25,000, as determined by low angle laser light scattering, comprising an unsaturated mono-carboxylic acid and an unsaturated sulfonic acid selected from the group consisting of 2-acrylamido-2-methylpropyl sulfonic acid, 2-methacrylamido-2-methylpropyl-sulfonic acid, styrene sulfonic acid, vinyl sulfonic acid, sulfoalkyl acrylate, sulfoalkyl methacrylate, allyl sulfonic acid, methallyl sulfonic acid, 3-methacrylamido-2-hydroxy-propyl sulfonic acid, sulfonic acid acrylate, their salts and mixtures thereof, having a weight ratio of 1:20 to 20:1, and (b) at least one compound selected from the group consisting of water-soluble polycarboxylates, phosphonates, organic phosphates, organic polyphosphates, metal salts and sulfonates.

The instant invention is also directed to a method of inhibiting the formation of insoluble alluvial, metal oxide and metal hydroxide deposits in an aqueous system, comprising adding to the system at least 0.1 mg/l of a water-soluble polymer having a weight average molecular weight of less than 25,000, as determined by low angle laser light scattering, comprising an unsaturated carboxylic acid and an unsaturated sulfonic acid, or their salts, having a weight ratio of 1:20 to 20:1 and a phosphonate.

The phrase "inhibiting the precipitation" is meant to include threshold inhibition, dispersion, solubilization, or particle size reduction.

The phrase "scale-forming salts" is meant to include any of the scale-forming salts, including but not limited to, calcium carbonate, calcium sulfate, calcium phosphate, calcium phosphonate (including calcium hydroxyethylidene diphosphonic acid), calcium oxalate, calcium fluoride, barium sulfate and magnesium salts.

The phrase "aqueous system" is meant to include any system containing water; including, but not limited to, cooling water, boiler water, desalination, gas scrubbers, blast furnaces, sewage sludge thermal conditioning equipment, reverse osmosis, sugar evaporators, paper processing, mining circuits and the like.

The carboxylic acid/sulfonic acid polymer was also found to be effective in inhibiting insoluble alluvial deposition, metal oxide and metal hydroxide deposition, especially in combination with a phosphonate. Alluvial deposits include silts; clays; particulate material extracted from the air, such as dust; and the like. Any metal oxide or metal hydroxide may be used. Examples of metal oxides are iron oxide and chromus oxide. An example of a metal hydroxide is zinc hydroxide.

Any unsaturated carboxylic acid or its salt may be used to prepare the polymer (a). Examples include acrylic acid, methacrylic acid, α-halo acrylic acid, maleic acid, itaconic acid, vinyl acetic acid, allyl acetic acid, fumaric acid, β-carboxyethyl acrylate, their salts and mixturess thereof. The preferred carboxylic acids are acrylic acid and methacrylic acid.

Any unsaturated sulfonic acid or its salt may be used in producing the polymer (a). Examples include 2-acrylamido-2-methylpropylsulfonic acid, 2-methacrylamido-2-methylpropylsulfonic acid, vinyl sulfonic acid, sulfo alkyl acrylate or methacrylate, allyl sulfonic acid, methallyl sulfonic acid, 3-methacrylamido-2-hydroxy propyl sulfonic acid, sulfonic acid acrylate, their salts and mixtures thereof. The preferred sulfonic acid is 2-acrylamido-2-methylpropylsulfonic acid.

Polymer (a) may be prepared from more than two monomers. Monomers other than carboxylic and sulfonic acids or their salts may be present in the polymer. Mixtures of the polymers may be used.

The weight ratio of carboxylic acid to sulfonic acid should be 1:20 to 20:1, preferably 1:10 to 10:1, most preferably 4:1 to 1:4.

Any water-soluble polycarboxylate may be used as component (b). Examples include polymers derived from homo- and/or copolymers (including terpolymers, tetra-, etc.) of acrylic acid, methacrylic acid, vinyl acetic acid, allyl acetic acid, fumaric acid, phosphonicarboxylic acid, maleic acid or anhydride, itaconic acid, α-halo acrylic acid and β-carboxyethyl acrylate. The preferred polycarboxylates are polymers prepared using monomers selected from the group consisting of acrylic acid, methacrylic acid and maleic acid or anhydride. These preferred polymers are low molecular weight polymers, i.e., polymers having a weight average molecular weight of less than about 25,000, as determined by low angle light scattering. The most preferred polymers are selected from the group consisting of: homopolymers of maleic acid or anhydride having a weight average molecular weight of less than about 10,000; homopolymers of acrylic acid having a weight average molecular weight of less than about 10,000; copolymers of acrylic acid and acrylamide having a weight average molecular weight of less than about 10,000 (also known as hydrolyzed polyacrylamides); copolymers of acrylic acid and 2-hydroxypropyl acrylate having a weight average molecular weight of less than about 10,000; and copolymers of maleic acid or anhydride and a sulfonated styrene having a molecular weight of about 10,000.

Low molecular weight sulfonated polystyrenes, having a weight average weight average molecular weight of less than about 10,000, are also preferred for use as component (b).

Any water-soluble phosphonate may be used as component (b). Examples include 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, polyamino phosphonates and the like. Additional phosphonates are identified in U.S. Pat. No. 3,837,803, which is hereby incorporated by reference. The preferred phosphonates are 2-phosphono-1,2,4-tricarboxybutane, amino tri(methylene phosphonic acid) and hydroxyethylidene diphosphonic acid.

Any water-soluble phosphate may be used as component (b). Examples include orthophosphates; condensed phosphates, such as sodium hexametaphosphate; phosphate esters; organophosphate esters, such as the lower alkyl mono-, di- and trialkyl phosphates. The alkyl group is selected from $C_1$ to $C_4$ and may be branched or unbranched. The alkyl group may be sustituted with hydroxy, amino, halide, sulfate or sulfonate, alone or in combination; and molecularly dehydrated phosphates.

Any water-soluble metal salt may be used as component (b). Examples include water-soluble salts or zinc, molybdenum, chromate and sodium silicate and mixtures thereof. The combination of zinc and chromate were found especially effective. The polymer stabilizes the zinc ion and prevents its precipitation at high pH.

Any water-soluble sulfonate-containing polymer may be used as component (b). Examples include homo- and/or copolymers of 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl or methallyl sulfonic acid, sulfonic acid acrylate, 3-methacrylamido-2- hydroxy propyl sulfonic acid, their salts and mixtures thereof.

It is possible that the carboxylic acid, from which the polycarboxylate used as component (b) is prepared, is the same carboxylic acid used to prepare the polymer of component (a). However, the carboxylic acid used to prepare component (b) is not polymerized with the same sulfonic acid as (a). The same is true with regards to the sulfonate.

The weight ratio of component (a) to component (b) is preferably 1:50 to 50:1, more preferably 1:10 to 10:1.

It is preferred that component (a) be a copolymer

The carboxylic acid/sulfonic acid polymer was found, in addition, to enhance the effectiveness of the water-soluble polycarboxylates, phosphonates, polyphosphates, phosphates, metal salts and sulfonates.

Calcium phosphate scale is a particular problem at a pH of 7 to 9. The admixtures of the instant invention were surprisingly found to be effective at a pH 7 to 9 and at temperatures ranging from 0° to 80° C. The admixtures of the instant invention are, of course, effective over a broad pH range (e.g. less than 7 to some extent, greater than 9).

The admixtures is used at a minimum dosage of 0.1 mg/l in inhibiting scale and corrosion, preferably at a dosage of 1 to 100 mg/l, most preferably 1 to 15 mg/l.

It is preferred that component (a) have a weight average molecular weight of less than 25,000, preferably less than 15,000, most preferably less than 10,000, as determined by low angle laser light scattering.

The admixture was found to be synergistic in that the admixture inhibited scale and corrosion to a greater extent than expected.

EXAMPLES

The following abbreviations and product names are used in the Examples and are defined as indicated:

AA/AMPS* = copolymer of acrylic acid and 2-acrylamido-2-methylpropyl sulfonic acid having a weight average molecular weight of about 8200, as determined by low angle laser light scattering.

* "AMPS" is a registered trademark of the Lubrizol Corporation.

CL361S = an aqueous solution of alkyl phenoxy poly(ethyleneoxy) ethanols and propylene oxide terminated ethylene oxide adduct, available from Calgon Corporation.

PMA = polymaleic acid, MWT = 1300, as determined by light scattering, 70 percent active.

HEDP = hydroxyethylidene diphosphonic acid.

PBS-AM = 2-phosphono-1,2,4-tricarboxybutane, manufactured by Mobay Chemical Corporation.

Natrol 42 = a solution of a 60/40 copolymer of acrylic acid and 2-hydroxypropyl acrylate, manufactured by National Starch Corporation.

Belclene 500 = phosphinocarboxylic acid, manufactured by Ciba Geigy.

Versa TL-3 = copolymer of maleic anhydride and sulfonated styrene, manufactured by National Starch Corporation.

Versa TL-70 = sulfonated polystyrene, manufactured by National Starch Corporation.

PAA = polyacrylic acid, MWT 4700, as determined by light scattering.

PolyAMPS = polyacrylamido methyl propyl sulfonic acid.

AMP = amino tri(methylene phosphonic acid).

$Zn^{++}$ = zinc ion added as zinc dissolved in hydrochloric acid. The concentration reported is solely zinc ion.

$CrO_4^{-2}$ = chromate ion added as potassium dichromate. The concentration reported is solely chromate ion.

P-35 = copolymer of 40 percent acrylamide and 60 percent acrylate, MWT 7500, manufactured by American Cyanamid.

PolyDMDAAC = polydimethyldiallyl ammonium chloride, MWT 130,000, as determined by light scattering.

$MoO_4^{-2}$ = molybdate ion added as sodium molybdate. The concentration reported is solely molybdate ion.

$PO_4^{-3}$ = phosphate ion added as potassium dihydrogen phosphate. The concentration reported is solely phosphate ion.

AA/AS = copolymer of acrylic acid and allyl sulfonic acid.

EXAMPLES 1 THROUGH 65

Synergism between copolymers of carboxylic acids and sulfonic acids and other building blocks were screened for threshold inhibition of calcium carbonate, calcium sulfate and calcium phosphate. Stagnant flask tests were used with solutions stored for 24 hours at constant temperature. The standard test conditions used were as follows:

|  | Calcium Carbonate | Calcium Sulfate | Calcium Phosphate |
|---|---|---|---|
| Calcium, mg/l | 200 | 2000 | 200 |
| Bicarbonate, mg/l | 600 | — | — |
| Sulfate, mg/l | — | 4800 | — |
| Phosphate, mg/l | — | — | 4 |
| pH | 8.0–8.2 | 7.0 | 8.5 |
| Temperature, °C. | 65 | 65 | 60 |

Four flasks were used for each test; one for a control (no inhibitor), one with the copolymer alone, one with the other inhibitor alone, and the last with both inhibitors. For all inhibitors, a level of inhibitor was picked which by itself would give 0 to 50 percent inhibition as determined by the following equation:

$$\text{Percent Inhibition} = \frac{S_T - S_c}{S_I - S_c} \times 100 \text{ where:}$$

$S_I$ = level of test specie initially;
$S_c$ = level of test specie at end of control test; and
$S_T$ = level of test specie at end of inhibitor test.

Calcium was used as the test specie in the calcium carbonate and calcium sulfate tests, and phosphate was the test specie in the calcium phosphate test. Synergism was determined by comparing the percent inhibition obtained using both inhibitors, each at the same level as used alone, with the sum of the inhibition obtained using the inhibitors alone. The results are summarized in Tables I, II and III.

EXAMPLES 66 THROUGH 85

Synergism data on the inhibition of iron oxide deposition by a combination of the copolymer and other building blocks was determined by zeta potential measurements. The test solution consisted of 500 mg/l iron oxide ($Fe_2O_3$) and 0.01M sodium nitrate (for ionic strength) at pH 7.1 to 7.2. Caustic was used to adjust the pH. The test solutions were treated with 1.0 mg/l of the copolymer and the various building blocks, alone or with a combination of 0.5 mg/l of the copolymer of and 0.5 mg/l of the other building block. The pH of the test solution was readjusted to 7.1 to 7.2, if necessary.

The change in zeta potential of the control (without inhibitor) with the inhibited solutions was determined. Synergism was noted when that change was greater in the solutions treated by the combination of building blocks than with the building blocks alone. The results are summarized in Table IV.

EXAMPLES 86 THROUGH 104:

The synergistic effects of the AA/AMPS copolymer and other building blocks for corrosion inhibition were determined in eight liter test cells using synthetic four-cycle Pittsburgh water at pH 7.5. The tests were run for 7 days at a constant temperature of 50° C. Two steel test coupons (1 inch×2 inches) were suspended on glass rods in each test cell. The test solution was constantly agitated by a submersible pump and air was constantly bubbled through the solution to keep it saturated.

The various test solutions were treated with the AA-/AMPS copolymer and the other building blocks, alone or with a combination of the copolymer and another building block. Synergism was determined by comparing the corrosion rates obtained on the test coupons from the cells containing the individual inhibitors with those from the cell containing the combination of inhibitors. The results are summarized in Table V.

EXAMPLE 105

The effect of the AA/AMPS copolymer in inhibiting the precipitation of calcium HEDP (hydroxyethylidene diphosphonic acid, a common scale inhibitor) precipitation was tested using synthetic four-cycle Pittsburgh water at pH 8.5. The tests were run for the number of days indicated at a constant temperature of 50° C. Thirty mg/l of HEDP was added. Fifty-three percent of the HEDP remained in solution in the absence of the copolymer. The turbidity was also measured and found to be 9 NTU. Ninety percent remained in solution when 15 mg/l, active, of a 60/40 AA/AMPS copolymer was added and the turbidity was 1.5 NTU.

The effect of the 60/40 AA/AMPS copolymer in preventing calcium HEDP precipitation in industrial water was tested at pH 8.5 at a constant temperature of 50° C. The results are summarized in Table VI.

EXAMPLE 106

Forty grams of zinc ion were added to 8 liters of Pittsburgh tap water which had been concentrated 4 times. Ten experiments were run, five without additive and five with 10 mg/l of 60/40 AA/AMPS. The temperature of the test solutions was maintained at 50° C. The pH of the five solutions without additive was 7.0, 7.5, 8.0, 8.5 and 9.0, respectively. The pH of the five additive-containing solutions was likewise 7.0, 7.5, 8.0, 8.5 and 9.0, respectively. Samples were taken after one and three days from each of the solutions. The samples were filtered and the zinc ion concentration determined by atomic adsorption spectrometry. The results are summarized in Table VII.

Both solutions at pH 9 contained 0.25 mg/l AMP to prevent any $CaCO_3$ precipitation and interference at the high pH with the zinc data.

EXAMPLE 107

3.1 grams of $CrO_3$ in 500 ml of distilled water was reduced to $Cr^{+3}$ with 25 ml of $NaHSO_3$. The pH was adjusted to 11 and the solution was stirred for 45 minutes. 20 ml of the mixture was added to 180 ml of Pittsburgh tap water which had been concentrated 4 times. The solution was split in two samples. 15 mg/l of active of 60/40 AA/AMPS was added to one of the samples. The two samples were shaken. In the sample without the additive, the precipitate settled after 5 minutes, while the sample containing the additive retained a blue turbidity and precipitate took much longer to settle. The effect was quantified using a Brinkmann colorimeter at 450 nm. The sample with no additive had a 69.1 percent change in transmittance after 7 minutes, while the sample with additive had only a 3.7 percent change in transmittance.

EXAMPLE 108

The change in percent transmittance of iron oxide-containing BOF water and various dispersants was determined using the fiber optics probe from a Brinkmann PC/1000 colorimeter. The percent dispersant effectiveness was calculated from the following:

$$100 \left(1 - \frac{\Delta \% \text{ transmittance with dispersant}}{\Delta \% \text{ transmittance without dispersant}}\right)$$

The iron oxide-containing BOF water was an industrial steel water sample characterized as follows:

| Ion | Total (mg/l) | Dissolved (mg/l) |
| --- | --- | --- |
| $CO_3^=$ | 24 | |
| $HCO_3^-$ | >968 | |
| $Cl^-$ | 110 | |
| $SiO^2$ | 1.5 | |
| $SO_4^=$ | 200 | |
| Orthophosphate | <0.05 | |
| Polyphosphate | <0.1 | |
| Organic Phosphate | <0.1 | |
| Fluoride | 32 | |
| Iron | 855 | <0.05 |
| Calcium | 560 | 19 |
| Magnesium | 152 | 34 |
| Suspended Solids | 3500 ≈ 3.5% | |

The percent dispersion effectiveness of various concentrations of additive to disperse iron oxide in BOF scrubber water at a pH of 8.8 is summarized in Table VIII.

EXAMPLE 109

(Polyphosphate Stabilization)

The ability of 60/40 AA/AMPS to stabilize polyphosphate (hexametaphosphate) was determined by measuring the reversion of polyphosphate to orthophosphate. 250 mg/l $HCO_3^-$ was added to 8 liters of water characterized as follows:

| Ion | mg/l |
| --- | --- |
| $Ca^{++}$ | 400 |
| $Mg^{++}$ | 48 |
| $SO_4^=$ | 788 |
| $Cl^-$ | 708 |
| $HCO_3^-$ | 250 | which had been concentrated 4 times. The pH was 8.5 and the temperature was 50° C. After 7 days, using 10 mg/l hexametaphosphate (9.0 mg/l PO₄), there was 0.433 mg/l total PO₄ still in solution. After 7 days, using 10 mg/l hexametaphosphate and 10 mg/l 60/40 AA-/AMPS, there was 8.95 mg/l total PO₄ still in solution.

TABLE 1

CaCO₃ Inhibition
200 mg/l $Ca^{++}$, 600 mg/l $HCO_3^-$, pH 8.0–8.2, 65° C. 24 Hours

| Example | Component A | Concentration (mg/l active) | Percent Inhibition | Component B | Concentration (mg/l active) | Percent Inhibition | Percent Expected A + B | Percent Actual A + B | Actual-Expected (Percent) |
|---|---|---|---|---|---|---|---|---|---|
| 1 | 60/40 AA/AMPS | 0.5 | 34 | Ortho Phosphate | 2.0 | 34 | 68 | 95 | +27 |
| 2 | 20/80 AA/AMPS | 0.5 | 5 | Ortho Phosphate | 2.0 | 28 | 33 | 60 | +27 |
| 3 | 60/40 AA/AMPS | 0.5 | 34 | CL-361S | 10.0 | 0 | 34 | 46 | +12 |
| 4 | 60/40 AA/AMPS | 0.5 | 34 | PMA | 0.1 | 12 | 46 | 52 | +6 |
| 5 | 60/40 AA/AMPS | 0.5 | 34 | HEDP | 0.05 | 23 | 57 | 60 | +3 |
| 6 | 80/20 AA/AMPS | 0.5 | 70 | Ortho Phosphate | 2.0 | 28 | 98 | 98 | 0 |
| 7 | 60/40 AA/AMPS | 0.5 | 34 | PBS-AM | 0.2 | 20 | 54 | 52 | −2 |
| 8 | 60/40 AA/AMPS | 0.5 | 34 | Natrol 42 | 0.5 | 34 | 68 | 66 | −2 |
| 9 | 60/40 AA/AMPS | 0.5 | 34 | Belclene 500 | 0.25 | 39 | 73 | 68 | −5 |
| 10 | 60/40 AA/AMPS | 0.5 | 34 | Versa TL-70 | 5.0 | 16 | 50 | 42 | −8 |
| 11 | 60/40 AA/AMPS | 0.5 | 34 | Poly AMPS | 10.0 | 4 | 38 | 25 | −13 |
| 12 | 60/40 AA/AMPS | 0.5 | 34 | PAA | 0.5 | 52 | 82 | 65 | −17 |
| 13 | 60/40 AA/AMPS | 0.5 | 34 | Sodium Hexa-meta Phosphate | 0.2 | 37 | 71 | 52 | −19 |
| 14 | 60/40 AA/AMPS | 0.5 | 34 | Versa TL-3 | 10.0 | 37 | 71 | 50 | −21 |
| 15 | 60/40 AA/AMPS | 0.5 | 34 | AMP | 0.1 | 30 | 64 | 42 | −22 |
| 16 | 60/40 AA/AMPS | 0.5 | 34 | P-35 | 1.0 | 68 | 102 | 69 | −33 |
| 17 | 60/40 AA/AMPS | 0.5 | 34 | Poly DMDAAC | 15.0 | 28 | 62 | 14 | −48 |
| 18 | 70/30 AA/AS | 1.0 | 62 | Ortho Phosphate | 2.0 | 28 | 90 | 77 | −13 |

TABLE II

CuSO₄ Inhibition
2000 mg/l $Ca^{++}$, 4800 mg/l $SO_4^{-2}$, pH 7.0, 65° C., 24 Hours

| Example | Component A | Concentration (mg/l active) | Percent Inhibition[a] | Component B | Concentration (mg/l active) | Percent Inhibition | Percent Expected A + B | Percent Actual A + B | Actual-Expected (Percent) |
|---|---|---|---|---|---|---|---|---|---|
| 19 | 60/40 AA/AMPS | 1.0 | 16.7 | AMP | 1.0 | 5.3 | 22.0 | 45.6 | +23.6 |
| 20 | 60/40 AA/AMPS | 1.0 | 16.7 | PMA | 1.0 | 47.4 | 64.1 | 85.1 | +21.0 |
| 21 | 60/40 AA/AMPS | 1.0 | 16.7 | PBS-AM | 1.0 | 5.3 | 22.0 | 36.8 | +14.8 |
| 22 | 60/40 AA/AMPS | 1.0 | 16.7 | Belclene 500 | 1.0 | 8.8 | 25.5 | 38.6 | +13.1 |
| 23 | 60/40 AA/AMPS | 1.0 | 16.7 | PAA | 0.5 | 10.5 | 27.2 | 36.0 | +8.8 |
| 24 | 60/40 AA/AMPS | 1.0 | 16.7 | HEDP | 1.0 | 4.4 | 21.1 | 26.3 | +5.2 |
| 25 | 20/80 AA/AMPS | 1.5 | 7.0 | AMP 1.0 | 2.0 | 9.0 | 13.0 | +4.0 | |
| 26 | 60/40 AA/AMPS | 1.0 | 11.0 | P-35 | 2.0 | 16.0 | 27.0 | 31.0 | +4.0 |
| 27 | 60/40 AA/AMPS | 1.0 | 16.7 | Netrol 42 | 0.5 | 8.8 | 25.5 | 28.9 | +3.4 |
| 28 | 20/80 AA/AMPS | 1.5 | 7.0 | PMA | 1.0 | 18.0 | 25.0 | 27.0 | +2.0 |
| 29 | 80/20 AA/AMPS | 1.5 | 25.0 | AMP | 1.0 | 2.0 | 27.0 | 28.0 | +1.0 |
| 30 | 60/40 AA/AMPS | 1.0 | 16.7 | Ortho Phosphate | 1.0 | 4.4 | 21.1 | 21.1 | 0 |
| 31 | 60/40 AA/AMPS | 1.0 | 16.7 | Sodium Hexa-meta Phosphate | 1.0 | 3.5 | 20.2 | 0 | |
| 32 | 60/40 AA/AMPS | 1.0 | 16.7 | CL-361 | 1.0 | 3.5 | 20.2 | 19.3 | −0.9 |
| 33 | 60/40 AA/AMPS | 1.0 | 16.7 | Versa TL-70 | 1.0 | 7.0 | 23.7 | 21.1 | −2.6 |
| 34 | 60/40 AA/AMPS | 1.0 | 16.7 | Versa TL-3 | 1.0 | 5.3 | 22.0 | 19.3 | −2.7 |
| 35 | 60/40 AA/AMPS | 1.0 | 11.0 | Poly AMPS | 4.0 | 5.0 | 16.0 | 13.0 | −3.0 |
| 36 | 80/20 AA/AMPS | 1.5 | 25.0 | PMA | 1.0 | 18.0 | 43.0 | 36.0 | −7.0 |
| 37 | 60/40 AA/AMPS | 1.0 | 16.7 | Poly DMDAAC | 1.0 | 5.3 | 22.0 | 8.8 | −13.2 |
| 38 | Versa TL-3 | 50.0 | 28 | AMP | 2.0 | 42 | 70 | 31 | −39 |
| 39 | 70/30 AA/AS | 2.0 | 14 | AMP | 2.0 | 42 | 56 | 100 | +44 |
| 40 | 70/30 AA/AS | 2.0 | 14 | PMA | 1.0 | 18 | 32 | 46 | +14 |

[a] Since the CuSo₄ inhibition curve is very steep, experimental variance is quite large.

TABLE III

Ca/PO₄ Inhibition
200 mg/l $Ca^{++}$, 4 mg/l $PO_4^{-3}$, pH 8.5, 60° C. 24 Hours

| Example | Component A | Concentration (mg/l active) | Percent Inhibition[a] | Component B | Concentration (mg/l active) | Percent Inhibition | Percent Expected A + B | Percent Actual A + B | Actual-Expected (Percent) |
|---|---|---|---|---|---|---|---|---|---|
| 41 | 60/40 AA/AMPS | 1.5 | 20 | Versa TL-3 | 4.0 | 20 | 40 | 97 | +57 |
| 42 | 60/40 AA/AMPS | 1.5 | 20 | Versa TL-70 | 10.0 | 36 | 56 | 100 | +44 |

TABLE III-continued

Ca/PO₄ Inhibition
200 mg/l Ca⁺⁺, 4 mg/l $PO_4^{-3}$, pH 8.5, 60° C. 24 Hours

| Example | Component A | Concentration (mg/l active) | Percent Inhibition[a] | Component B | Concentration (mg/l active) | Percent Inhibition | Percent Expected A + B | Percent Actual A + B | Actual-Expected (Percent) |
|---|---|---|---|---|---|---|---|---|---|
| 43 | 60/40 AA/AMPS | 1.5 | 23 | PAA | 1.5 | 30 | 53 | 95 | +42 |
| 44 | 60/40 AA/AMPS | 1.5 | 16 | P-35 | 5.0 | 31 | 47 | 81 | +34 |
| 45 | 80/20 AA/AMPS | 1.5 | 6 | PAA | 1.5 | 13 | 19 | 45 | +26 |
| 46 | 80/20 AA/AMPS | 1.5 | 6 | Versa TL-3 | 4.0 | 57 | 63 | 86 | +23 |
| 47 | 60/40 AA/AMPS | 1.5 | 23 | PMA | 1.5 | 30 | 53 | 75 | +22 |
| 48 | 60/40 AA/AMPS | 1.5 | 23 | Natrol 42 | 3.0 | 54 | 77 | 95 | +18 |
| 49 | 60/40 AA/AMPS | 1.5 | 23 | Belclene 500 | 5.0 | 44 | 67 | 76 | +9 |
| 50 | 20/80 AA/AMPS | 1.5 | 18 | Versa TL-3 | 4.0 | 57 | 75 | 77 | +2 |
| 51 | 60/40 AA/AMPS | 1.5 | 14 | Poly DMDAAC | 1.5 | 5 | 19 | 19 | 0 |
| 52 | 20/80 AA/AMPS | 1.5 | 18 | PAA | 1.5 | 13 | 31 | 31 | 0 |
| 53 | 60/40 AA/AMPS | 1.5 | 20 | Poly AMPS | 10.0 | 34 | 34 | 50 | −4 |
| 54 | 60/40 AA/AMPS | 1.5 | 26 | CL-361 | 10.0 | 5 | 31 | 22 | −9 |
| 55 | 60/40 AA/AMPS | 1.5 | 26 | Dioctyl Sulfo Succinate | 10.0 | 5 | 31 | 13 | −18 |
| 56 | 60/40 AA/AMPS | 1.5 | 23 | AMP | 1.5 | 28 | 51 | 27 | −24 |
| 57 | 60/40 AA/AMPS | 1.5 | 14 | PBS-AM | 1.5 | 29 | 43 | 18 | −25 |
| 58 | 60/40 AA/AMPS | 1.5 | 23 | Sodium Hexameta Phosphate | 1.5 | 20 | 43 | 15 | −28 |
| 59 | 60/40 AA/AMPS | 1.5 | 23 | HEDP | 1.5 | 30 | 53 | 19 | −34 |
| 60 | Versa TL-3 | 5.0 | 19 | Versa TL-70 | 10 | 39 | 58 | 63 | +5 |
| 61 | 70/30 AA/AS | 5.0 | 20 | Versa TL-70 | 10 | 39 | 59 | 20 | −39 |
| 62 | Versa TL-3 | 5.0 | 19 | PAA | 1.5 | 20 | 39 | 19 | −20 |
| 63 | 70/30 AA/AS | 5.0 | 20 | PAA | 1.5 | 20 | 40 | 30 | −10 |
| 64 | Versa TL-3 | 5.0 | 19 | P-35 | 5.0 | 24 | 43 | 86 | +43 |
| 65 | 70/30 AA/AS | 5.0 | 20 | P-35 | 5.0 | 34 | 44 | 72 | +28 |

[a]The AA/AMPS CaPO₄ inhibition was tested each time a comparison test was conducted. The testing was conducted over a several week period. Since the CaPO₄ inhibition curve is very steep, experimental variance is quite large.

TABLE IV

Fe₂O₃
500 mg/l Fe₂O₃, .01M NaNO₃, pH 7.10–7.16

| Example | Component A | Δ Zeta Potential (mv)[a] | Component B | Δ Zeta Potential (mv) | A + B Δ Zeta Potential (mv) | Synergism |
|---|---|---|---|---|---|---|
| 66 | 60/40 AA/AMPS | 30 | PBS-AM | 31 | 37 | X |
| 67 | 60/40 AA/AMPS | 30 | HEDP | 32 | 34 | X |
| 68 | 60/40 AA/AMPS | 50 | AMPS | 48 | 49 | |
| 69 | 60/40 AA/AMPS | 50 | P-35 | 49 | 50 | |
| 70 | 60/40 AA/AMPS | 50 | Natrol 42 | 54 | 47 | |
| 71 | 60/40 AA/AMPS | 50 | Belclene 500 | 49 | 47 | |
| 72 | 60/40 AA/AMPS | 30 | PAA | 24 | 28 | |
| 73 | 60/40 AA/AMPS | 50 | Dioctyl Sulfo Succinate | 5 | 45 | |
| 74 | 60/40 AA/AMPS | 30 | PMA | 30 | 26 | |
| 75 | 60/40 AA/AMPS | 50 | CL-361S | 1 | 44 | |
| 76 | 60/40 AA/AMPS | 30 (50) | Versa TL-70 | 28 | (40) | |
| 77 | 60/40 AA/AMPS | 50 | Sodium Hexameta Phosphate | 41 | 40 | |
| 78 | 60/40 AA/AMPS | 50 | $PO_4^{-3}$ | 30 | 42 | |
| 79 | 60/40 AA/AMPS | 50 | Versa TL-3 | 49 | 39 | |
| 80 | 60/40 AA/AMPS | 30 | AMP | 26 | 23 | |
| 81 | 60/40 AA/AMPS | 50 | DMDAAC | 26 | 30 | |
| 82 | Versa TL-3 | 23 | PBS-AM | 26 | 35 | X |
| 83 | 70/30 AA/AS | 22 | PBS-AM | 26 | 51 | X |
| 84 | Versa TL-3 | 23 | HEDP | 26 | 60 | X |
| 85 | 70/30 AA/AS | 22 | HEDP | 26 | 24 | |

[a]The AA/AMPS Δ zeta potential for Fe₂O₃ shifted during the experimentation. The zeta potential for AA/AMPS was measured for each example. Aging of iron oxide is believed to be the cause of the zeta potential shift.

TABLE V

Steel Corrosion Inhibition
4 Cycle Pittsburgh Water, 50° C., pH 7.5, 7 Days

| Example | Component A | Concentration (mg/l active) | Corrosion Rate mpy | Component B | Concentration (mg/l active) | Corrosion Rate mpy | Corrosion Rate (mpy) A + B | Synergism |
|---|---|---|---|---|---|---|---|---|
| 86 | Blank | | | Blank | | | 74.0 | |
| 87 | 60/40 AA/AMPS | 20 | 49.0 | Zn⁺⁺ | 10 | 23.9 | 31.5 | |
| 88 | 60/40 AA/AMPS | 75 | 20.1 | Zn⁺⁺ | 10 | 23.9 | 12.9 | X |
| 89 | 60/40 AA/AMPS | 10 | 55.6 | AMP | 10 | 32.9 | 24.4 | X |

TABLE V-continued

Steel Corrosion Inhibition
4 Cycle Pittsburgh Water, 50° C., pH 7.5, 7 Days

| Example | Component A | Concentration (mg/l active) | Corrosion Rate mpy | Component B | Concentration (mg/l active) | Corrosion Rate mpy | Corrosion Rate (mpy) A + B | Synergism |
|---|---|---|---|---|---|---|---|---|
| 90 | 60/40 AA/AMPS | 75 | 20.1 | AMP | 10 | 32.9 | 5.0 | X |
| 91 | 60/40 AA/AMPS | 10 | 55.6 | HEDP | 10 | 25.9 | 23.9 | X |
| 92 | 60/40 AA/AMPS | 75 | 20.1 | HEDP | 10 | 25.9 | 6.0 | X |
| 93 | 60/40 AA/AMPS | 10 | 55.6 | Sodium Hexa-meta Phosphate | 10 | 19.4 | 22.6 | |
| 94 | 60/40 AA/AMPS | 75 | 20.1 | Sodium Hexa-meta Phosphate | 10 | 19.4 | 5.8 | X |
| 95 | 60/40 AA/AMPS | 75 | 20.1 | $PO_4^{-3}$ | 10 | 3.6 | 2.7 | X |
| 96 | 60/40 AA/AMPS | 75 | 20.1 | $CrO_4^{-2}$ | 25 | 0.5 | 2.0 | |
| 97 | 60/40 AA/AMPS | 75 | 20.1 | PBS-AM | 10 | 41.8 | 6.9 | X |
| 98 | 60/40 AA/AMPS | 75 | 20.1 | $MoO_4^{-2}$ | 25 | 62.4 | 8.4 | X |
| | | | | | | | 50 mg/l A + 50 mg/l B | |
| 99 | 60/40 AA/AMPS | 100 | 8.7 | Natrol 42 | 100 | 8.0 | 15.4 | |
| 100 | 60/40 AA/AMPS | 100 | 8.7 | PMA | 100 | 28.9 | 27.2 | |
| 101 | 60/40 AA/AMPS | 100 | 8.7 | PAA | 100 | 10.1 | 7.1 | X |
| 102 | 60/40 AA/AMPS | 100 | 8.7 | 35/10/55 AA/DMDAAC/AM | 100 | 67.0 | 38.5 | |
| 103 | 60/40 AA/AMPS | 100 | 8.7 | Belclene 500 | 100 | 27.6 | 28.2 | |
| 104 | 60/40 AA/AMPS | 100 | 8.7 | Poly DMDAAC | 100 | 43.5 | 49.0 | |

TABLE VI

Calcium Phosphate Inhibition - Industrial Water[1]

| Condition | NTU | Initial $PO_4^{-3}$ Level | Final $PO_4^{-3}$ Level | Comments |
|---|---|---|---|---|
| No Additive | 10 | 11 | 5 | After 7 Days |
| 3 mg/l HEDP/10 mg/l TRC-233 | 30 | 14 | 4 (3 $PO_4$, 1 HEDP) | After 7 Days |
| 30 mg/l HEDP/50 mg/l TRC-233 | 1.5 | 41 | 40 (17.5 $PO_4$, 22 HEDP) | After 5 Days Turbidity remained constant for at least three weeks |

[1]310 mg/l calcium ion, 76 mg/l magnesium ion, 960 mg/l chlorides, 4800 mg/l sulfate ion, 30 mg/l nitrate ion, 60 mg/l silica, 11 mg/l orthophosphate.

TABLE VII

Initial Zinc Concentration 5 mg/l
in 4 Cycle Pittsburgh Water[1]; 50° C.

| | Zinc Concentration (mg/l) Without Additive | | Zinc Concentration (mg/l) with 10 mg/l 60/40 AA/AMPS Copolymer | |
|---|---|---|---|---|
| pH | Day 1 | Day 3 | Day 1 | Day 3 |
| 7.0 | 4.1 | 4.5 | 4.5 | 4.8 |
| 7.5 | 3.8 | 4.4 | 4.8 | 5.4[2] |
| 8.0 | 0.90 | 0.65 | 4.6 | 4.7 |
| 8.5 | 0.30 | 0.25 | 4.5 | 4.9 |
| 9.0 | 0.25 | 0.30 | 4.6 | 4.6 |

[1]88 mg/l $Ca^{++}$, 24 mg/l $Mg^{++}$, 328 mg/l $SO_4^=$, 70 mg/l $Cl^-$, 40 mg/l $HCO_3^-$.
[2]Values slightly elevated above 5 mg/l due to a concentrating effect due to solution evaporation.

TABLE VIII

| Additiveness | Active Concentration (mg/l) | Percent Dispersant Effectiveness |
|---|---|---|
| 60/40 AA/AMPS | 4 | 80 |
| 60/40 AA/AMPS | 8 | 90 |
| 60/40 AA/AMPS | 12 | 100 |
| 60/40 AA/AMPS and HEDP | 1 | 74 |
| 60/40 AA/AMPS and HEDP | 2 | 96 |
| 60/40 AA/AMPS and HEDP | 3 | 100 |

What is claimed is:

1. A method of inhibiting the precipitation of scale-forming salts of alkaline earth metal cations, including calcium phosphate, in an aqueous system, comprising adding to said aqueous system at least 0.1 mg/l of an admixture comprising:

(a) a water-soluble polymer having a weight average molecular weight of less than 25,000, as determined by low angle laser light scattering, selected from the group of polymers comprising:

(i) an unsaturated mono-carboxylic acid selected from the group consisting of acrylic acid and methacrylic acid; and (ii) an unsaturated sulfonic acid selected from the group consisting of 2-acrylamido-2-methylpropyl sulfonic acid and 2-methacrylamido-2-methylpropyl sulfonic acid;

wherein the weight ratio of (i):(ii) ranges from 1:4 to 4:1; and (b) at least one member selected from the group consisting of: phosphino carboxylic acid, low molecular weight homopolymers of maleic acid or anhydride having a weight average molecular weight of less than 25,000, low molecular weight homopolymers of acrylic acid having a weight average molecular weight of less than about 25,000, low molecular weight copolymers of acrylamide and acrylate having a weight average molecular weight of less than about 10,000, copolymers of acrylic acid and 2-hydroxypropyl acrylate having a weight average molecular weight of less than about 10,000, copolymers of maleic acid or anhydride and sulfonated styrene having a weight average molecular weight of less than about 10,000 and sulfonated polystyrenes having a weight average molecular weight of less than about 10,000;

wherein the weight ratio of (a):(b) is about 1:10 to about 10:1.

* * * * *